United States Patent [19]

Satran et al.

[11] Patent Number: 5,078,550

[45] Date of Patent: Jan. 7, 1992

[54] CUTTING INSERT

[75] Inventors: Amir Satran, Kfar Havradim; Carol Smilovici, Acre, both of Israel

[73] Assignee: Iscar Ltd., Tefen, Israel

[21] Appl. No.: 578,062

[22] Filed: Sep. 5, 1990

[30] Foreign Application Priority Data

Sep. 7, 1989 [GB] United Kingdom ............... 8920227

[51] Int. Cl.⁵ .............................................. B23C 5/10
[52] U.S. Cl. ...................................... 407/34; 407/113
[58] Field of Search ................... 407/34, 30, 53, 113, 407/56, 61, 63

[56] References Cited

U.S. PATENT DOCUMENTS

| | | | |
|---|---|---|---|
| 2,761,196 | 9/1956 | Graves et al. | 407/34 |
| 3,792,515 | 2/1974 | Lundgren | 407/113 X |
| 3,827,119 | 8/1974 | Bennett | 407/113 X |
| 4,940,369 | 7/1990 | Aebi et al. | 407/113 X |

Primary Examiner—Larry I. Schwartz
Assistant Examiner—Julie R. Daulton
Attorney, Agent, or Firm—Burgess, Ryan and Wayne

[57] ABSTRACT

A cutting insert for use in a peripheral rotary milling cutter having a cylindrical holder and a side cutting edge defined between a cutting rake surface and a side relief flank and a side base edge defined between the side relief flank and a base surface. The side relief flank has first and second component side relief flank surfaces which intersecet at an intersection line, the latter extending along the side relief flank from a first position adjacent a leading end of the insert and located at an intermediate position thereof to a second position intersecting the cutting edge and adjacent a trailing end of the insert. The component flank surfaces are substantially planar and are angularly disposed with respect to one another so that an insert side relief angle ($\gamma_A$) as defined with respect to the cylindrical holder in the region of the leading end substantially equals an insert side relief angle ($\gamma_B$) in the region of the trailing end.

3 Claims, 6 Drawing Sheets

CUTTING INSERT

FIELD OF THE INVENTION

This invention relates to a peripheral, rotary, milling cutter comprising a substantially cylindrical holder in which are formed one or more peripheral recesses in which are respectively and releasably mounted a corresponding number of exchangeable hard metal cutting inserts, the or each recess furthermore providing for a swarf space in front of each insert.

BACKGROUND OF THE INVENTION

The cutting insert used in milling cutter tools consists generally of a prismatic body having a planar base from which extend side surfaces—relief flank surfaces—which are intersected by the upper surface—the cutting rake surface. The cutting insert has at least one cutting edge which is defined as an edge created by the intersection of the cutting rake surface and the relief flank.

The insert is so held in the tool that the cutting edge is located in the circular cutting path of the tool and is inclined with reference to the rotary axis by an angle referred to as the axial rake angle.

The magnitude of the axial rake angle has a direct influence on the stability of the tool during operation and also on the durability of the cutting edge. In general, it is advantageous to have the inserts disposed at as large an axial rake angle as is compatible with avoiding structural weakening of the tool.

It is known that with inserts for milling cutter tools the relief angles employed are relatively large as compared with the angles used with stationary cutting tools, and this is particularly the case with milling tools having low diameter cutting paths. Furthermore, where the tool is to be used in milling highly ductile materials such as, for example, aluminium, even greater relief angles are required as compared to those indicated when, e.g., steel workpieces are to be milled. Increasing the relief angle, however, can lead to a weakening of the cutting edge and there is in consequence a limitation of the magnitude of the relief angle. On the other hand, a reduction in the magnitude of the relief angle tends to increase the wear surface of the insert in contact with the workpiece and this places a lower limit on the magnitude of the relief angle. In general, the magnitude of the relief angle is determined in accordance with the material of the workpiece, the material from which the cutting edge is formed and the cutting path diameter of the tool. Thus, with hard and tough workpiece materials, the relief angle is generally chosen to be between 12° to 20° with tools of high speed steel, and between 8° to 12° with carbide tools. On the other hand, with workpieces of mild steels, cast iron, etc., the relief angle can in fact be as high as 20°.

It has been found, however, that with peripheral rotary milling cutters, as a result of the location of the inserts so as to present an axial rake angle with respect to the longitudinal axis of the cutter, the relief angle presented by the cutting edge at its leading end is very much greater than the relief angle presented by the cutting edge at its opposite trailing end. On the assumption that the relatively smaller relief angle presented by the insert at its trailing end is, in fact, the minimum relief angle which should be employed, it will be realized that the relief angle at the leading end is unduly large, thereby leading to an increased danger of weakening of the cutting edge at this point and a consequent lowering of tool life.

BRIEF SUMMARY OF THE INVENTION

It is an object of the present invention to provide a new and improved peripheral rotary milling cutter having at least one cutting insert in which some or all of the above-referred-to disadvantages are substantially reduced or overcome.

According to the present invention there is provided for use in a peripheral rotary milling cutter having a cylindrical holder and at least one replaceable, peripherally disposed cutting insert, a cutting insert having a side cutting edge defined between a cutting rake surface and a side relief flank and a side base edge defined between said side relief flank and a base surface, characterised in that said side relief flank comprises first and second component side relief flank surfaces intersecting at an intersection line extending along the side relief flank from a first position adjacent a leading end of the insert and located at an intermediate position thereof to a second position intersecting said cutting edge and adjacent a trailing end of the insert, said component flank surfaces being substantially planar and being angularly disposed with respect to one another so that an insert side relief angle as defined with respect to the cylindrical holder in the region of the leading end substantially equals an insert side relief angle in the region of the trailing end.

Preferably, and where the insert is double ended, i.e. is formed with front and rear cutting edges as well as with opposite side cutting edges so that by reversing the clamped position of the insert in the tool holder, the previous trailing end of the insert now becomes the leading end thereof and vice versa, each side flank is formed with such component flank surfaces (the inclination of the respective intersecting lines of each pair of flank surfaces being oppositely directed.

By virtue of the insert construction in accordance with the present invention, it can be ensured that the insert can be provided with a relatively large radial rake angle without correspondingly weakening the cutting edge. This is achieved by ensuring that the relief angle at the leading end of the insert is not unduly large. In this way the side cutting edge is strengthened precisely at the position thereof where it is subjected to the greatest stresses and cutting forces. At the same time, by having the lowermost component flank surfaces (defined between the intersection lines and the base edges) of conventional slopes and relative dimensions, it can be ensured that the insert can be effectively retained in conventional tool holders wherein the tool holder support surfaces engage these conventionally directed and dimensioned component flank surfaces.

German Gebrauchsmuster No. G 89 15 088.0 (MINA) discloses a milling cutter insert having a side relief flank having a plurality of angularly disposed component side relief flank surfaces. Mina explains that the purpose in dividing the relief flank surface in this manner was to facilitate the use of milling cutter tools having inserts with relatively increased axial and radial rake angles (such increased angles being considered to be conducive to increased milling efficiency). As the axial rake angle is increased, the trailing portions of a base edge of the insert approach closer and closer to the circular cutting path of the tool and the danger therefore arises that the base edge will actually touch the workpiece with consequential interference in the milling process. Mina proposes to overcome this danger whilst at the same time enjoying the benefit of an increased axial rake angle by forming the side relief flank with a component side relief flank surface adjacent the base edge of the insert which is angularly disposed with respect to the remaining side relief flank surface adjacent the cutting edge so that the base edge of the insert is spaced inwardly with respect to the circular cutting path of the tool.

With the insert in accordance with the present invention, however, the component side relief flank surface adjacent the cutting edge is so chosen that the side relief angles (as defined with respect to a cylindrical holder) are substantially equal in the regions of the leading and trailing ends of the insert with all the advantages thereof as set out in the specification. Mina does not relate to these requirements. As for the remaining side relief surface adjacent the base edge of the insert, the present invention does not come to change its form but merely requires that it be such as to render it capable of being securely mounted on the tool holder.

BRIEF SUMMARY OF THE DRAWINGS

For a better understanding of the present invention, and to show how the same may be carried out in practice, reference will now be made to the accompanying drawings in which.

DETAILED DESCRIPTION OF PREFERRED EMBODIMENT

Figure 1:
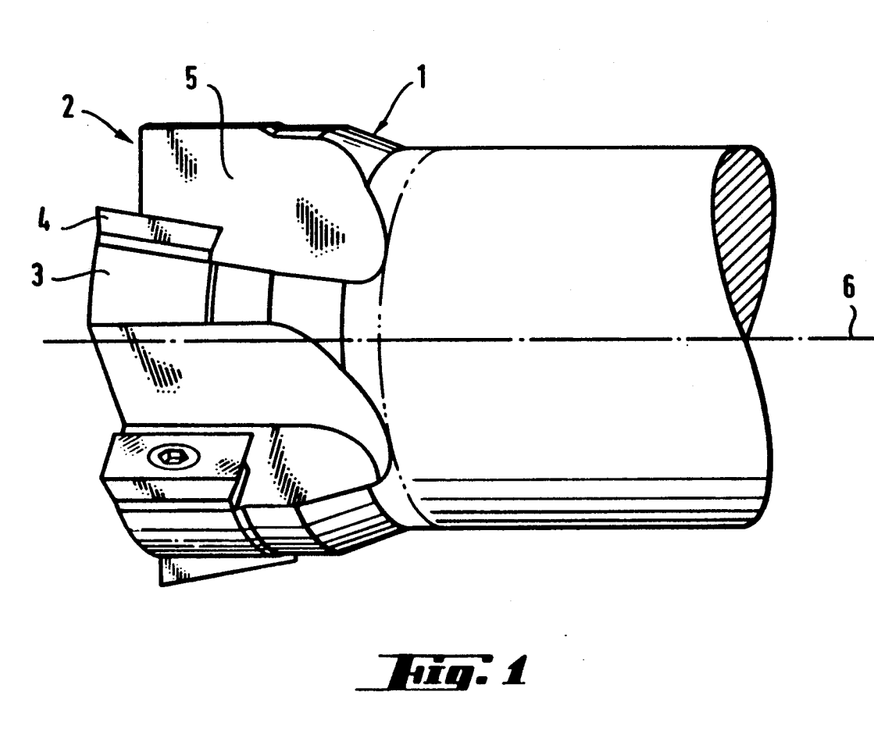
FIG. 1 is a perspective view of one known form of milling cutter to which the invention can be applied.

FIG. 1 shows a rotary milling cutter of the kind to which the present invention refers. As seen, the cutter comprises a cylindrical holder 1 in which are formed substantially equiangularly distributed recesses 2, each recess including an insert support base 3 on which is releasably mounted an exchangeable hard metal cutting insert 4. The remainder of the recess 2 constitutes a swarf space 5. The holder is suitably mounted on a machine tool (not shown) so as to be rotatable about a longitudinal axis 6.

Figure 2:
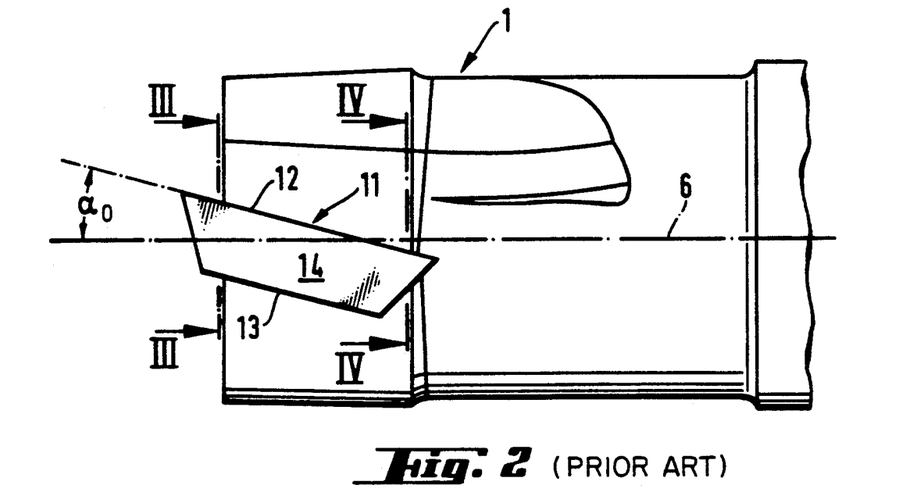
FIG. 2 is a schematic side elevation of a portion of a simplified cutter, illustrating the location of a known cutting insert on and with respect to the cutter holder.
Figure 3:
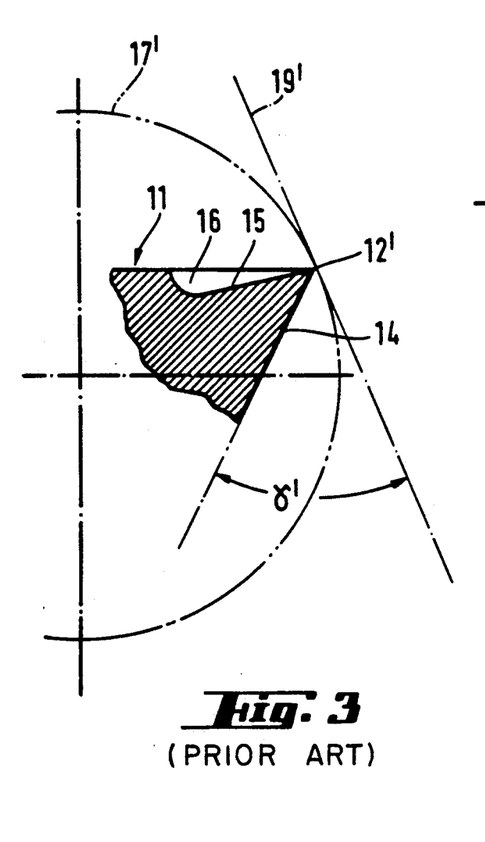
FIG. 3 is a cross-sectional view taken along the line III—III of the insert shown in FIG. 2, superimposed on an associated circular cutting path.
Figure 4:
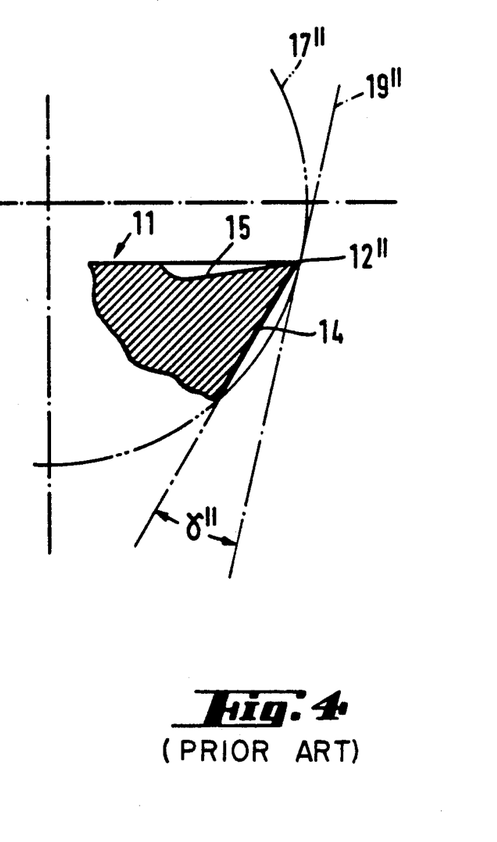
FIG. 4 is a similar cross-sectional view taken along the line IV—IV.

Before proceeding with a detailed description of the preferred embodiment in accordance with the invention, reference will first of all be made to FIGS. 2, 3 and 4 of the drawings, which illustrate some of the relevant geometry of a milling cutter of the kind to which the present invention is applied, using, however, conventional cutting inserts. The schematic side elevation shown in FIG. 2 has been simplified for the purposes of explanation in that there is only shown here the mounting of a single cutting insert.

As seen in FIG. 2, a cutting insert 11 is mounted in an appropriate peripheral recess of the cylindrical holder 1, the cutting insert 11 having an elongated cutting edge 12 parallel to the corresponding edge 13 of the base of the insert 11. The cutting edge 12 defines an angle $a_0$ with respect to the axis 6.

Referring to FIGS. 3 and 4, there are here seen respective cross-sectional views of a portion of the insert 11 taken along the lines III—III and IV—IV (corresponding to leading and rear portions of the insert), shown respectively superimposed on the circular path followed by the respective point on the cutting edge 12 lying on the respective section line. As seen in FIGS. 3 and 4, the insert 11 is formed with a flank surface 14 and with a rake surface 15 which forms part of an elongated chip forming groove 16. The cutting edge 12 is defined at the intersection of the flank 14 and the rake surface 15 and the respective section lines III—III and IV—IV intersect the cutting edge 12 at the points 12' and 12" as shown respectively in FIGS. 3 and 4 of the drawings. With the rotation of the cutting tool, the point 12' along the cutting edge 12 follows a circular path 17' as shown in FIG. 3, whilst the point 12" follows a path 17" as shown in FIG. 4.

As seen in FIG. 3, a relief angle $\gamma'$ is defined between the flank 14 and a tangent 19' to the circle 17' at the point 12'. As seen in FIG. 4 of the drawings, a relief angle $\gamma''$ is defined between the flank surface 14 and a tangent 19".

Bearing in mind the considerations referred to above concerning optimal relief angles, it will be readily seen from FIGS. 3 and 4 of the drawings that whilst the relief angle $\gamma''$ (seen in FIG. 4 and presented in the trailing section of the insert) is probably of an effective optimum minimal value, the corresponding angle $\gamma'$ (shown in FIG. 3 and presented at the leading portion of the insert) is of an excessively large value and this, at a position of the insert subject to the greatest cutting forces. Such excessively large relief angles can result in a weakening of the cutting edge, resulting in a danger of fracture when a heavy cutting load is applied.

Having thus described the geometry and the inherent disadvantages of known cutting inserts in rotary milling cutters of the kind to which the present invention applies, we shall now proceed to a detailed consideration of the preferred embodiment in accordance with the present invention and, in this connection, reference will now be made to FIGS. 5–13 of the drawings, which illustrate the construction and geometry of a cutting insert in accordance with the present invention for use with a rotary milling cutter 20 comprising a cylindrical holder 20a.

Figure 5:
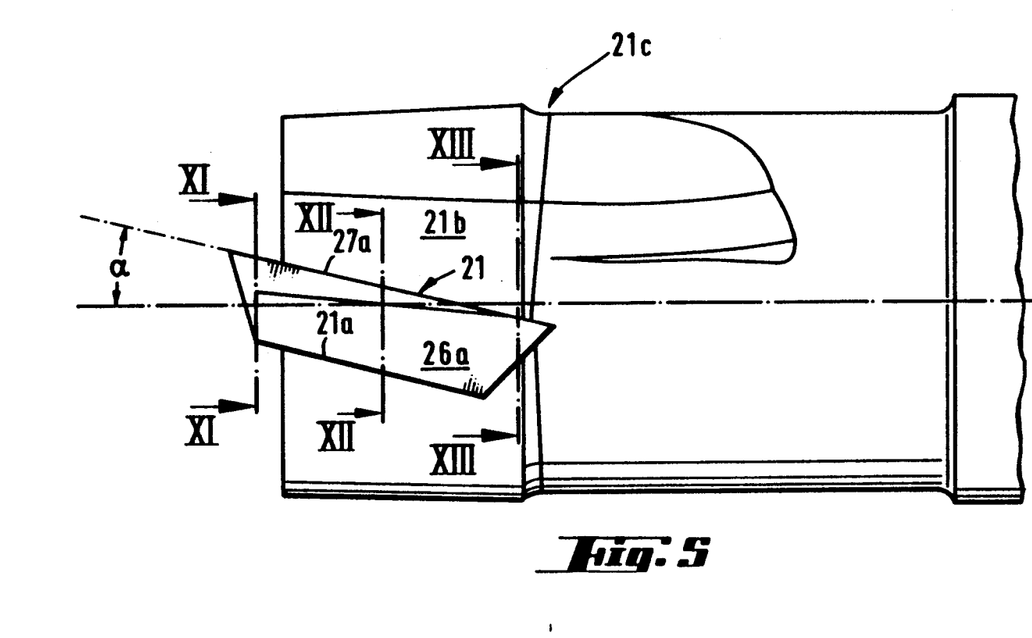
FIG. 5 is a schematic side elevation of a simplified cutter, showing the mounting thereon of a cutting insert in accordance with the invention.
Figure 6:
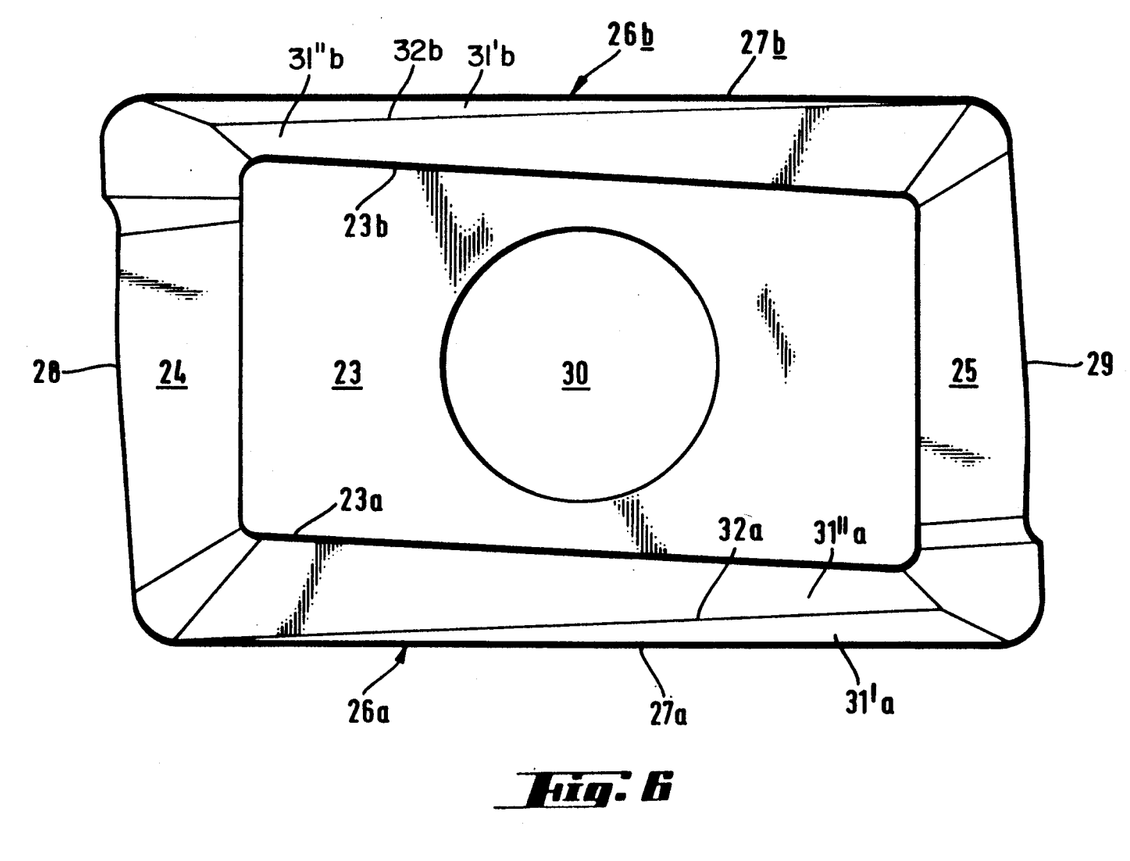
FIG. 6 is a plan view from below of the cutting insert in accordance with the invention.
Figure 7:
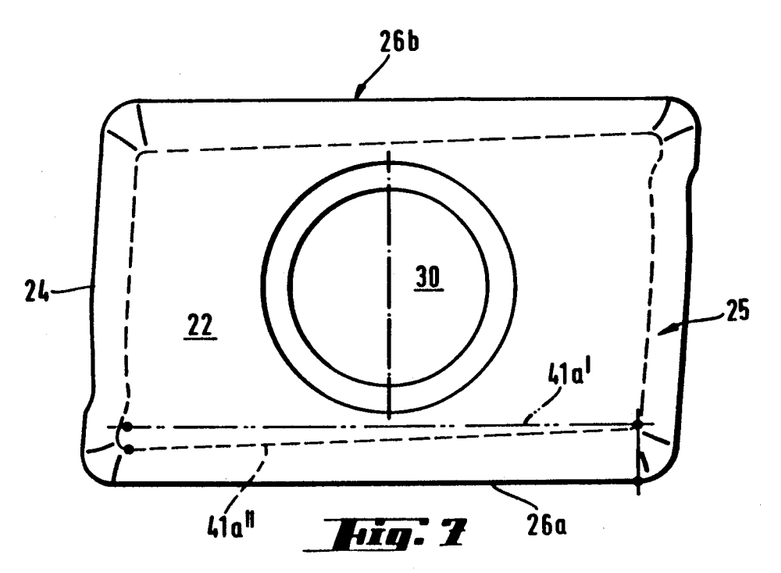
FIG. 7 is a plan view from above of the cutting insert as shown in FIG. 6.
Figure 8:
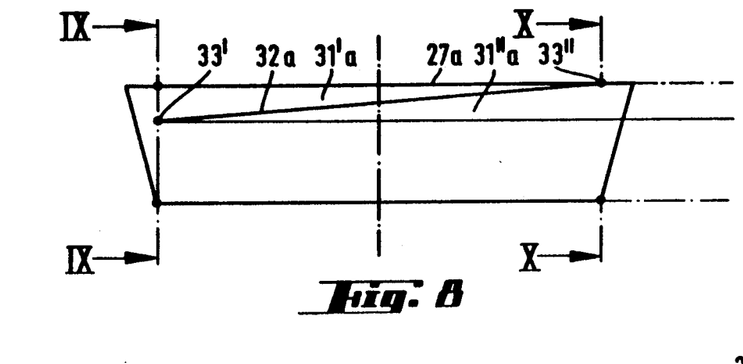
FIG. 8 is a side elevation of the cutting insert as shown in FIGS. 6 and 7.

As seen in FIGS. 5, 6 and 7 of the drawings, an insert 21 is mounted on a seating 21a formed in a recess 21b located within a holder 21c.

The insert 21 is located at an axial rake angle $\alpha$ with respect to the longitudinal axis of the tool holder and, as seen particularly in FIGS. 6 and 7 of the drawings, is formed with an upper rake surface 22, a lower base surface 23, front and rear flank surfaces 24 and 25 and side flanks 26a and 26b. Side cutting edges 27a and 27b are respectively defined between the side flanks 26a and 26b and the upper rake surface 22. The side flanks 26a and 26b terminate respectively at the base surface 23 in base edges 23a and 23b. Front and rear cutting edges 28 and 29 are respectively defined between the front and rear flank surfaces 24 and 25 and the upper rake surface 22. A central hole 30 is formed in the insert 21 for the screw clamping of the insert 21 to the tool holder 21c.

The side flank 26a comprises first and second component relief flank surfaces 31'a and 31"a which intersect at an intersection line 32a which extends along the side relief flank 26a from a first position 33' adjacent a leading end of the insert located position of this leading end to a second position 33" intersecting the cutting edge 27a and adjacent a trailing end of the insert. These component relief flank surfaces 31'a and 31"a are both planar and are angularly disposed with respect to each other.

In a similar fashion, the side flank 26b is formed with component relief flank surfaces 31'b and 31"b which intersect at an intersection line 32b, the directions of slope of the intersection lines 32a and 32b being opposite.

Figure 9:
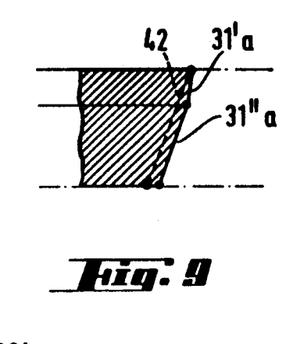
FIGS. 9 and 10 are respectively cross-sectional views of one side of the cutting insert shown in FIG. 8 taken respectively along the lines IX—IX and X—X.
Figure 10:
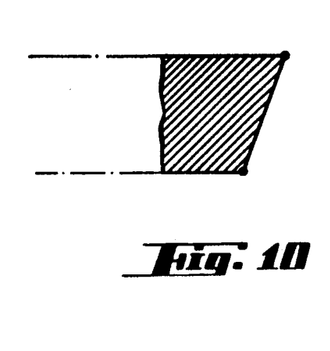

FIG. 9 clearly shows the respectively differing slopes of the component relief flank surfaces along the section line IX—IX whilst FIG. 10, taken as it is along a section line X—X which passes through the position 33" where the intersection line 32a intersects the cutting edge 27a, shows the slope of the now unitary relief flank surface which slope is equal to the slope of the component relief flank surface along its entire length.

FIGS. 7 and 9 will be again referred to below for an explanation of the mode of determination of the location of the component relief flank surface 31'a.

Figure 11:
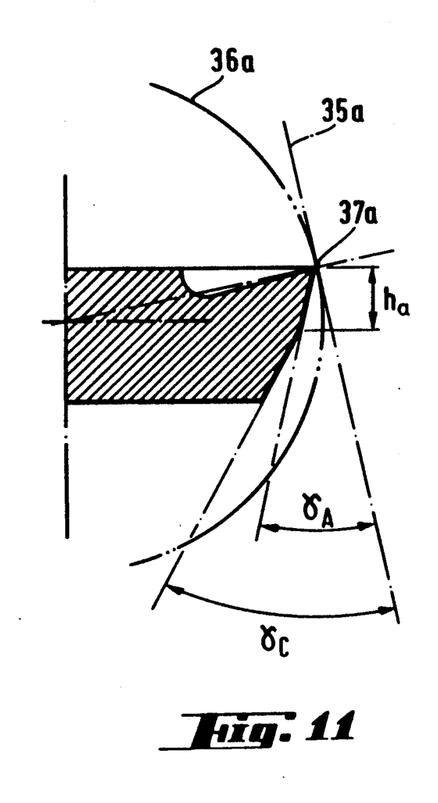
FIGS. 11, 12 and 13 are respective cross-sectional views of the milling cutter and cutting insert shown in FIG. 5, taken along the lines XI—XI, XII—XII and XIII—XIII and shown superimposed on the associated circular cutting path.
Figure 12:
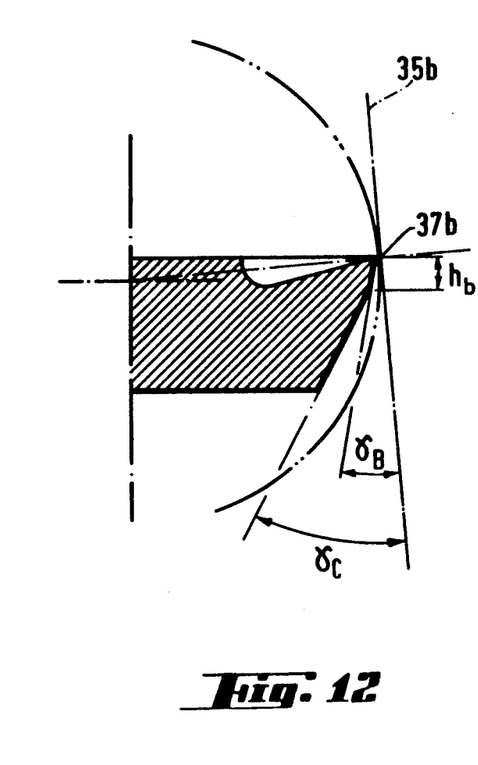
Figure 13:
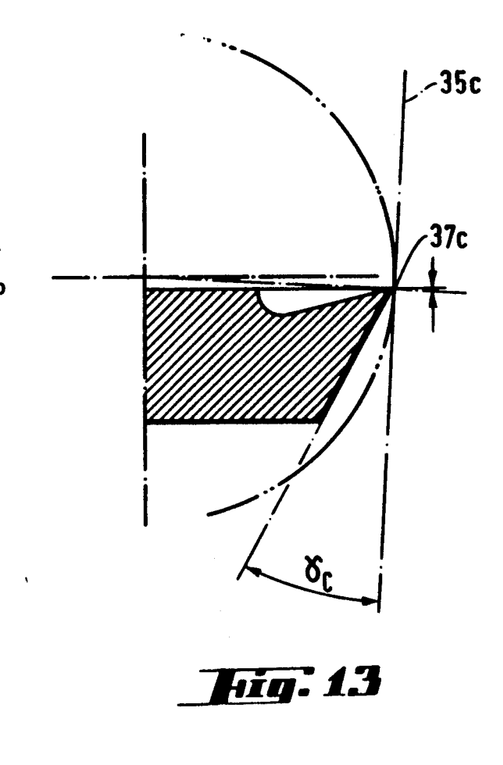

Reference will now be made to FIGS. 11, 12 and 13 of the drawings, which are respective cross-sectional views of a portion of the insert 21 taken along the lines XI—XI, XII—XII and XIII—XIII of FIG. 5, shown respectively superimposed on the circular paths followed by the respective points on the cutting edge 25 lying on the respective section lines.

As seen in FIG. 11, a relief angle $\gamma_A$ is defined between the component relief flank surface 31'a and a tangent 35a to a circular path 36a at a point 37a. In this region the height $h_a$ of the component relief flank surface 31'a is a maximum. Similarly, as seen in FIG. 12 of the drawings, which refer to an intermediate point 37b along the cutting edge 25, a relief angle $\gamma_B$ is defined between the component relief flank surface 31'a and a tangent 35b. The height $h_b$ of the component relief flank surface 31'a in this region is less than $h_a$. Finally, at the point 37c at the trailing end of the cutting edge 27a, a relief angle $\gamma_C$ is defined between the unitary flank surface 31"a and a tangent 35c, the component flank surface 31'a no longer appearing in this region.

The relief angle $\gamma_A$ of the component relief flank surface 31'a at the leading end of the insert 22 is chosen to be substantially equal to the relief angle $\gamma_C$ of the unitary relief flank surface at the trailing end of the insert and in this way the cutting edge at the leading end is suitably strengthened so as to withstand the considerable cutting forces exerted on the leading end. It will be seen that whilst $\gamma_A \approx \gamma_B$, $\gamma_C$ at the intermediate point of the cutting edge is less than either $\gamma_A$ or $\gamma_B$. Nevertheless, it is found that choosing the relief angle in the leading portions of the cutting edge which are subjected to the greatest cutting forces so as to be substantially equal to the relief angle in the trailing end of the cutting edge, is effective in strengthening the most sensitive portions of the cutting edge and thereby extending tool life.

It is furthermore clear from FIGS. 11, 12 and 13 of the drawings that, by virtue of the provision of the upper component relief flank surface 31'a, it is possible to provide the insert with a relatively high radial rake angle (i.e. a high positive cutting edge) without at the same time dangerously weakening the cutting edge at its leading end whereit is subjected to the highest stresses and cutting forces.

In determining the parameters which govern the design of the relief flank and the component surfaces thereof so as to achieve the results described above, the following given factors have to be borne in mind:
(i) A predetermined average cutting diameter $D_A$;
(ii) A predetermined axial rake angle $\alpha_o$;
(iii) A minimum relief angle $\gamma_M$ (determined by wear characteristics of insert and workpiece materials).

On the basis of these factors an optimum relief angle $\gamma_o$ is determined and this is effectively the relief angle of trailing end of the insert (in the present case $\gamma_C$).

In a particular example,
$D_A = 40$ mm.
$\alpha_o = 75°$
$\gamma_M = 6°$

If now, as seen in FIG. 6 of the drawings, the base 23, the front and rear flanks 24 and 25 and the component side relief flank surfaces 31"a and 31"b maintain an essentially symmetrical shape, the upper rake surface 22, the cutting edges 27a and 27b and the component relief flank surfaces 31'a and 31'b are notionally "twisted" with respect to the base 23 so that, as shown in FIG. 7, the chain dotted line 41'a corresponding to the notional original boundary of the base 23 is displaced to the broken line 41"a. Similarly, as shown in FIG. 9 of the drawings, the broken line 42 corresponding to the notional original side flank surface of the insert is displaced to the parallel surface of the component flank surface 31"a and the now parallel component flank surface 31'a.

By virtue of the fact that the original symmetrical disposition of the base and the lower component flank surfaces of the insert is maintained, the insert can be readily clamped in conventional manner bearing against the conventional clamping surfaces of a conventional tool holder.

Furthermore, whilst the invention has been specifically described with reference to a double end cutting insert having a pair of side cutting edges and front and rear cutting edges, the invention is equally applicable to a single ended cutting insert.

We claim:
1. For use in a peripheral rotary milling cutter having a cylindrical holder and at least one replaceable, peripherally disposed cutting insert, a cutting insert having a side cutting edge defined between a cutting rake surface and a side relief flank and a side base edge defined between said side relief flank and a base surface, wherein said side relief flank comprises first and second component side relief flank surfaces intersecting at an intersection line extending along the side relief flank from a first position adjacent a leading end of the insert and located at an intermediate postion thereof to a second position intersecting said cutting edge and adjacent a trailing end of the insert, said component flank surfaces being substantially planar and being angularly disposed with respect to one another so that an insert side relief angle as defined with respect to the cylindrical holder in the region of the leading end substantially equals an insert side relief angle in the region of the trailing end.

2. A cutting insert according to claim 1 and being of substantially parallelipipedal shape and wherein it is provided with a pair of side cutting edges at opposite sides of the insert and defined between respective side relief flanks and said cutting rake surface, each side relief flank being formed with respective component side relief flank surfaces having respective intersection lines with opposite directions of slope.

3. A cutting insert according to claim 2 wherein it furthermore comprises front and rear cutting edges defined respectively between said rake cutting surface and front and rear flank surfaces.

* * * * *